March 26, 1957
R. N. JOLLY
2,786,987
LOCK-IN GEOPHONE FOR BOREHOLES
Filed Aug. 3, 1954
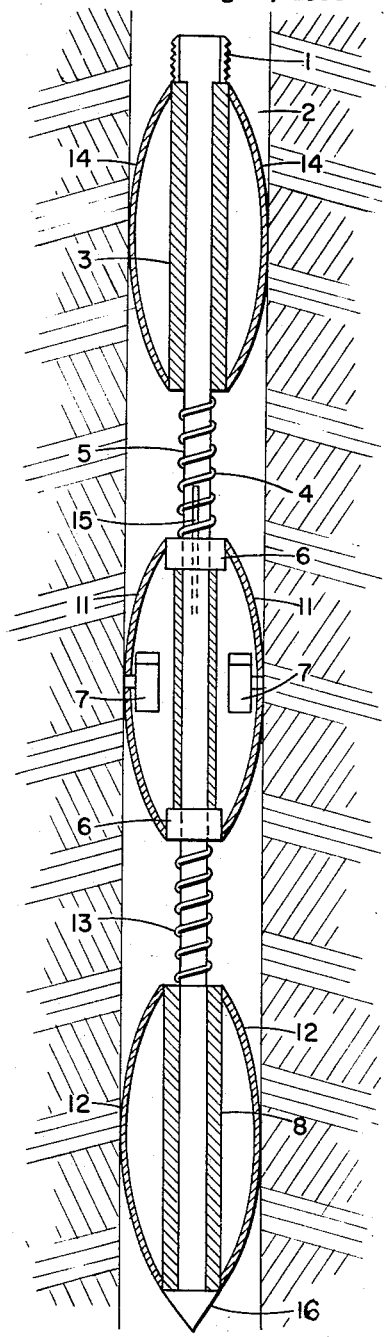
RICHARD N. JOLLY INVENTOR.
BY
*W. N. Wright* ATTORNEY United States Patent Office 2,786,987
Patented Mar. 26, 1957

2,786,987
LOCK-IN GEOPHONE FOR BOREHOLES

Richard N. Jolly, Tulsa, Okla., assignor to Esso Research and Engineering Company, a corporation of Delaware Application August 3, 1954, Serial No. 447,508

4 Claims. (Cl. 340—17)

This invention concerns a novel geophone arrangement adapted for use in boreholes. In the geophone arrangement of this invention, provision is made to force the geophone tightly against the wall of a borehole in such a manner that the geophone is isolated from all mechanical elements in a manner preventing spurious signals. Provision is made in accordance with this invention for forcing a geophone against the wall of a borehole so that activation of the geophone will occur only by receipt of seismic energy from the surrounding formation.

In exploration for petroleum, the nature of earth strata is commonly identified by techniques of seismic exploration. In such seismic prospecting, seismic energy is generated on or near the surface of the earth by means of a suitable explosion or impact, causing seismic waves to travel into and through the earth. Portions of the downwardly directed energy are reflected or refracted by underlying strata in the earth, and this reflected or refracted energy can be detected at or near the surface of the earth with seismic detectors or geophones. This general technique makes it possible to obtain information concerning the nature, configuration and depth of subsurface strata.

In seismic exploration, it is generally necessary to ascertain the velocity of seismic energy through particular earth strata in order to precisely calculate the depth of reflecting horizons by the technique described. For this purpose, a geophone or seismic detector can be placed at different levels in a borehole so that the velocity of seismic energy through strata above the geophone may be determined by timing the interval between generation of seismic energy at the earth's surface and reception of the seismic energy at the geophone. Deep-hole geophones may also be employed for other purposes. For example, in particular locations, it may be desirable during seismic prospecting to employ vertical arrays of geophones which may be arranged in a borehole. For these and other purposes, it becomes necessary to provide a geophone or a seismic detector which can receive seismic energy from the wall of a borehole without distortion of the seismic energy and without the development of spurious signals.

There have been many suggestions concerning the nature of geophones which can be locked in a borehole. However, there are real problems involved in providing a suitable lock-in geophone arrangement, and these have not yet been completely or satisfactorily solved. For example, if a geophone is simply suspended in a borehole by means of a cable, vibration of the cable will inevitably cause false signals at the geophone. Again, simple suspension of this type fails to provide effective coupling of the geophone with the earth; close coupling is required in order to detect seismic energy without distortion. Arrangements which can readily be contemplated for tightly forcing the geophone against the wall of the borehole in order to obtain good coupling will also normally cause development of false signals. In these and other cases, the basic difficulty is that the geophone is improperly activated through mechanical coupling with suspension devices or by the loading device which forces the geophone against the wall of the borehole. It is thus the purpose of this invention to provide a geophone arrangement permitting the geophone to be tightly forced against the wall of the borehole while being essentially isolated from the mechanical components required to accomplish this.

The nature and principles of this invention will be described with reference to a preferred embodiment of the invention which is diagrammatically illustrated in a cross-sectional elevational view in the accompanying drawing.

Referring to the drawing, a geophone arrangement is illustrated in operative position in a borehole. Essentially, the geophone arrangement constitutes a central assembly of basket springs with geophones attached to one or more of the bows of the springs. Auxiliary centering spring arrangements are positioned above and below the spring arrangement carrying the geophone or geophones. These elements are so arranged and so designed, as will be described, that the geophones are essentially free of coupling with these essential mechanical elements.

The central spring arrangement carrying the geophones slides on a small diameter tubing 5. Collars 6 loosely encircle the tubing 5 so as to accommodate an elastic cushion which may be composed, for example, of rubber. Preferably, the collar 6 should be of sufficient I. D. to leave space between the cushion and tube 5 so that with reasonable alignment there will be no contact at all between the cushion and the tubing. The cushion is provided merely as a precaution to prevent metal-to-metal contact in case the hole wall should be abnormally rough and the centering therefore poor. Leaf springs 11 are connected to each of the collars 6 in the bowed configuration illustrated; preferably, three such leaf springs are employed. It is important that these springs be light to decrease the effective weight of the geophones and at the same time be as stiff as possible to increase the coupling to the hole wall. Both of these factors operate to improve the high frequency response of the geophone, which is one of the objectives of the invention serving to prevent distortion of the pulses in the recording process. Geophones 7, which may be of conventional character, are fixed to the bowed portion of each leaf spring 11 so that each geophone can be tightly forced against the wall of the borehole.

Since, as described, the cushioned collars 6 are normally maintained free of contact with guide 5, the arrangement described, is free of any vertical coupling between the guide 5 and the geophones 7. Coupling between horizontal movement of the guide support 5 and geophones 7 is minimized by the cushioned collars described and is essentially eliminated by the remaining elements to be described.

In order to suitably suspend this arrangement in a borehole, a massive member is preferably placed below the geophone spring arrangement in order to carry the device downwardly into a borehole. In the geophone illustrated, mass required for this purpose is primarily positioned below the geophone arrangement and this mass is provided by a heavy steel tubing 8, and to the extent required, by the heavy lower termination illustrated as conical member 16. In order that collars 6 remain centered with respect to guide 5, a centering spring arrangement is also associated with these elements. A suitable centering arrangement may be provided as illustrated by fixing both ends of each of the leaf springs 12 to tubing 8 in a bowed configuration.

In this arrangement, the tubular guide 5 is rigidly attached to the heavy tubing 8. A coil spring 13 fitting about tube 5 and acting against the top of tube 8 and the bottom of the lower collar 6, serves to suspend the geophone spring arrangement. This is a precautionary measure to prevent lower collar 6 from making mechanical contact with tubing 8, in case the hole walls are so smooth that springs 11 will not prevent the central geophone assembly from slipping down. Leaf springs 11 and 12 acting together minimize any radial misalignment of the arrangement in the borehole, while the spring suspension provided by spring 13 serves to guard against any vertical motion of the geophone spring arrangement. In holes deviating substantially from the vertical, it is possible that springs 12 acting in conjunction with springs 11 would not be sufficient to center collars 6 with respect to tubing 5. To improve radial alignment in such cases an uppermost centering basket 2 is provided which is similar in nature to the lower centering basket described. Again, the uppermost centering basket may constitute a heavy tubing 3 to which are fixed the bowed leaf springs 14. Tubing 3 is rigidly attached to tubing 5. The mass of tubing 3 supplements the mass of the lower elements in order to provide sufficient weight to carry the entire arrangement down a borehole. The provision of mass in the centering spring arrangements above and below the suspended geophones also aids in providing a fully stable arrangement.

A coil spring 4 positioned about the tube 5 between tubing 3 and the upper collar 6 may be provided if desired. When employed, spring 4 will be weak as compared to spring 13 so that acting together, springs 4 and 13 will suspend the geophone spring arrangement on the support 5 in an elastic manner, if suspension is necessary due to a smooth hole.

The entire arrangement described may readily be suspended in a borehole by coupling a conventional logging cable head to the threaded portion 1 of the uppermost tubing 3.

It should be observed that use of springs 4 and 13, above and below the geophones, is optional and normally these springs will not be used at all. In using this apparatus, the assembly is lowered into a borehole by means of a logging cable, for example, having conductors attached to the geophones 7. During this operation, the upper collar 6 will be forced against the bottom of weight 3 by the frictional resistance of springs 11 against the borehole wall. When the apparatus has been lowered to the desired depth, the logging cable is pulled up somewhat, in order to lift weight 3 above the top collar 6 since the geophone assembly will normally stay in place due to the retarding force of springs 11. Due to the action of the centering means described, the geophone assembly will then be free of all mechanical coupling with any of the massive portions of the apparatus and the supporting cable.

Thus it will be observed that in this arrangement, the provision of the upper and lower centering baskets serves to fully center the collars with respect to the guide support. Provision of these centering springs above and below the geophones, in combination with the elastic cushioned collars fixed to the geophone springs, essentially eliminates all possibility for horizontal coupling to the geophones. As described, spring 13 below the geophones together with spring 4 above the geophones are only employed in the case of an extremely hard, smooth borehole wall. Even when required, however, use of this spring serves to essentially eliminate coupling between the suspension means and the geophones.

If desired, one or both of the collars 6 may be slotted to accommodate keys 15 fitted in tube 5 to prevent any independent rotation of the central geophone centering springs.

While the arrangement described is particularly adapted for cable suspension as described, if desired, the device may be suspended by means of a conventional drill string. In this case if desired, loading of the device may be facilitated by circulating water or drilling mud in the drill string.

It is apparent that any number and any selected type of geophones may be employed in the manner described. Thus, if desired, the number of bows of the centering basket carrying the geophones may be increased to accommodate many additional geophones.

What is claimed is:

1. A geophone arrangement adapted for use in a borehole comprising in combination a center tubular guide, a bowed spring centering basket surrounding said guide in vertically sliding relation, at least one geophone fixed to the midpoint of a spring of said centering basket whereby to force said geophone against the wall of the borehole, and at least one additional centering basket fixed to said tubular guide and spaced vertically from the first centering basket.

2. The geophone arrangement defined by claim 1 in which the said additional centering basket is positioned below the first centering basket and including a coil spring slidably positioned about said central guide and interposed between said two centering baskets whereby to mechanically isolate said first centering basket.

3. The apparatus defined by claim 1 including elastic cushioning between the said guide and the first mentioned centering basket.

4. A geophone arrangement comprising in combination: a tubular guide support, a bowed spring centering basket having upper and lower collar elements encircling said guide in clearance relation therewith, auxiliary bowed spring centering baskets positioned on said guide support in fixed relation thereto above and below the first mentioned spring centering basket, and at least one geophone fixed to the midpoint of a spring of the first mentioned spring centering basket.

References Cited in the file of this patent

UNITED STATES PATENTS

| | | |
|---|---|---|
| 2,396,935 | Walstrom | Mar. 19, 1946 |
| 2,428,168 | Loper | Sept. 30, 1947 |
| 2,646,680 | Steele, et al. | July 28, 1953 |
| 2,650,067 | Martin | Aug. 25, 1953 |
| 2,669,688 | Doll | Feb. 16, 1954 |
| 2,681,442 | Schurman | June 15, 1954 |

FOREIGN PATENTS

| | | |
|---|---|---|
| 804,111 | France | Oct. 16, 1936 |